United States Patent
Larsson

(10) Patent No.: US 12,224,542 B2
(45) Date of Patent: Feb. 11, 2025

(54) POWER CABLE ACCESSORY ASSEMBLY

(71) Applicant: NKT HV Cables AB, Lyckeby (SE)

(72) Inventor: Gustaf Larsson, Lyckeby (SE)

(73) Assignee: NKT HV Cables AB, Lyckeby (SE)

( * ) Notice: Subject to any disclaimer, the term of this patent is extended or adjusted under 35 U.S.C. 154(b) by 0 days.

(21) Appl. No.: 18/327,940

(22) Filed: Jun. 2, 2023

(65) Prior Publication Data
US 2023/0402771 A1 Dec. 14, 2023

(30) Foreign Application Priority Data
Jun. 10, 2022 (EP) ..................... 22178428

(51) Int. Cl.
*H02G 15/02* (2006.01)
*H01B 9/00* (2006.01)
*H01R 4/70* (2006.01)

(52) U.S. Cl.
CPC ................. *H01R 4/70* (2013.01); *H01B 9/00* (2013.01); *H02G 15/02* (2013.01)

(58) Field of Classification Search
CPC ...................................................... H02G 15/02
See application file for complete search history.

(56) References Cited

U.S. PATENT DOCUMENTS 4,698,458 A   10/1987 Parmigiani et al.
5,416,272 A    5/1995 Darcy

FOREIGN PATENT DOCUMENTS

| EP | 886340 A1 | 12/1998 |
| EP | 844687 B1 | 5/2001 |
| EP | 115638 A1 | 11/2001 |
| EP | 2846430 B1 | 10/2017 |
| JP | 6280460 B2 | 2/2018 |
| KR | 1020210120368 A | 10/2021 |

OTHER PUBLICATIONS

Extended European Search Report; Application No. 22178428.3; Completed: Nov. 9, 2022; Mailed: Nov. 11, 2022; 10 Pages.

*Primary Examiner* — Chau N Nguyen
(74) *Attorney, Agent, or Firm* — Whitmyer IP Group LLC

(57) ABSTRACT

A power cable accessory assembly including: a first power cable including: first conductor, and a first electrical insulation layer arranged around the first conductor, wherein the first electrical insulation layer includes a first insulation groove extending circumferentially along an outer surface of the first electrical insulation layer, a connection sleeve including: a first axial end opening receiving an end portion of the first conductor protruding axially from the first electrical insulation layer, and a first locking sleeve groove extending circumferentially along an outer surface of the connection sleeve; and a first locking sleeve including: a first radially inwards extending flange engaging with the first insulation groove and a second radially inwards extending flange engaging with the first locking sleeve groove to restrict axial movement between the first electrical insulation layer and the connection sleeve, wherein the first radially inwards extending flange has a first radial dimension that decreases gradually in an axial direction towards the connection sleeve, and wherein the first insulation groove has a second radial dimension that decreases gradually in the axial direction towards the connection sleeve.

18 Claims, 1 Drawing Sheet

POWER CABLE ACCESSORY ASSEMBLY

TECHNICAL FIELD

The present disclosure generally relates to power cable accessories.

BACKGROUND

When installing power cable accessories such as joints and terminations, the insulation system of the power cable(s) is/are partly stripped off from the conductor(s) close to the conductor joint. This can result in an undesired phenomenon called shrinkback when the cable heats up in operation if the insulation comprises polymeric material. Shrinkback occurs when the insulation pulls back from the conductor joint because of built-in mechanical stresses in the insulation from the manufacturing process. This increases the risk of electrical breakdown due to a translation of the insulation edge from the intended position by design.

EP1 158 638 discloses a solution to reduce the risk of shrinkback. According to EP1 158 638, a cable joint arrangement comprises a connection tube sleeve for mechanically joining two conductors of a first and a second cable, wherein the tube sleeve comprises a circumferential groove on either end. The groove is adapted to interface with an anchor element and the anchor element is further adapted to interface with a cut groove in the cross-linked polyethylene (XLPE) insulation of the cable end such that the tube sleeve is mechanically connected to the insulation of either cable end.

There is a risk of bending of the flanges in the XLPE insulation received by the anchor element. At some shrinkage force and increased temperature, these flanges will disengage from the anchor elements because of the relatively low bending stiffness of XLPE at elevated temperatures.

SUMMARY

A general object of the present disclosure is to provide a power cable accessory assembly that solves or at least mitigates the problems of the prior art.

There is hence provided a power cable accessory assembly comprising: a first power cable comprising: first conductor, and a first electrical insulation layer arranged around the first conductor, wherein the first electrical insulation layer comprises a first insulation groove extending circumferentially along an outer surface of the first electrical insulation layer, a connection sleeve comprising: a first axial end opening receiving an end portion of the first conductor protruding axially from the first electrical insulation layer, and a first locking sleeve groove extending circumferentially along an outer surface of the connection sleeve; and a first locking sleeve comprising: a first radially inwards extending flange engaging with the first insulation groove and a second radially inwards extending flange engaging with the first locking sleeve groove to restrict axial movement between the first electrical insulation layer and the connection sleeve, wherein the first radially inwards extending flange has a first radial dimension that decreases gradually in an axial direction towards the connection sleeve, and wherein the first insulation groove has a second radial dimension that decreases gradually in the axial direction towards the connection sleeve.

Due to the angled shape of the first insulation groove and the first radially inwards extending flange, the first locking sleeve will push the first electrical insulation layer towards the underlying first conductor and thus increase the friction force to balance the axial shrinkage force. Further, increased temperature increases the friction force because the first electrical insulation layer expands radially. The risk of shrinkback can thus be reduced.

The first power cable may be a medium voltage power cable, for example for voltages in the range of 1-72 kV.

The first power cable may be a high voltage power cable, for example for voltages higher than 72 kV.

The first power cable may be an AC power cable or a DC power cable.

The first electrical insulation layer may be an extruded layer.

According to one embodiment the first radial dimension that decreases gradually decreases at a first linear rate. A surface of the first radially inwards extending flange that defines the gradual decrease of the first radial dimension may thus have a constant inclination.

According to one embodiment the second radial dimension that decreases gradually decreases at the first linear rate. A surface of the first insulation groove that defines the gradual decrease of the second radial dimension may thus have a constant inclination which is the same as said surface of the first radially inwards extending flange.

According to one embodiment the first radially inwards extending flange has a maximal radial dimension that is greater than a maximal radial dimension of the second radially inwards extending flange.

According to one embodiment the first radially inwards extending flange has a surface that defines the gradually decreasing first radial dimension, wherein in a longitudinal section of the first locking sleeve the surface defines an axis that intersects a longitudinal axis of the first locking sleeve with an angle in a range of 15-80 degrees, such as 20-80 degrees, such as 25-75 degrees, such as 30-70 degrees.

According to one embodiment the first radial dimension decreases gradually in an axial direction towards the connection sleeve only for an axial length that is between ⅓ and ⅔ of the largest radial thickness of the first electrical insulation layer outside the first insulation groove.

According to one embodiment the first electrical insulation layer has a smallest radial first insulation thickness in the first insulation groove, and a largest radial thickness outside the first insulation groove, wherein the smallest radial first insulation thickness is in a range of ⅓ to ½ of the largest radial thickness of the first electrical insulation layer.

According to one embodiment the first electrical insulation layer comprises a thermosetting polymer such as cross-linked polyethylene, XLPE.

According to one embodiment the first radially inwards extending flange has a far edge relative to the connection sleeve, the far edge being rounded or bevelled.

According to one embodiment the power cable accessory assembly forms a power cable termination.

According to one embodiment the power cable accessory assembly forms a power cable joint, and comprises: a second power cable comprising: second conductor, and a second electrical insulation layer arranged around the second conductor, wherein the second electrical insulation layer comprises a second insulation groove extending circumferentially along an outer surface of the second electrical insulation layer, wherein the connection sleeve is arranged axially between the first electrical insulation layer and the second electrical insulation layer, and comprises: a second axial end opening receiving an end portion of the second conductor protruding axially from the second electrical insulation layer, a second locking sleeve groove extending circumferentially along an outer surface of the connection sleeve; and a second locking sleeve comprising a third radially inwards extending flange engaging with the second insulation groove and a fourth radially inwards extending flange engaging with the second locking sleeve groove to restrict axial movement between the second electrical insulation layer and the connection sleeve, and wherein the third radially inwards extending flange has a third radial dimension that decreases gradually in an axial direction towards the connection sleeve, and wherein the second insulation groove has a fourth radial dimension that decreases gradually in the axial direction towards the connection sleeve.

The second power cable may be a medium voltage power cable, for example for voltages in the range of 1-72 kV.

The second power cable may be a high voltage power cable, for example for voltages higher than 72 kV.

The second power cable may be an AC power cable or a DC power cable. The second power cable is an AC power cable if the first power cable is an AC power cable and a DC power cable if the first power cable is a DC power cable.

The second electrical insulation layer may be an extruded layer.

According to one embodiment the third radial dimension that decreases gradually decreases at a second linear rate. A surface of the third radially inwards extending flange that defines the gradual decrease of the third radial dimension may thus have a constant inclination.

According to one embodiment the fourth radial dimension that decreases gradually decreases at the second linear rate. A surface of the second insulation groove that defines the gradual decrease of the fourth radial dimension may thus have a constant inclination which is the same as said surface of the second radially inwards extending flange.

According to one embodiment the third radially inwards extending flange has a surface that defines the gradually decreasing third radial dimension, wherein in a longitudinal section of the second locking sleeve the surface defines an axis that intersects a longitudinal axis of the second locking sleeve with an angle in a range of 15-80 degrees, such as 20-80 degrees, such as 25-75 degrees, such as 30-70 degrees.

According to one embodiment the third radial dimension decreases gradually in an axial direction towards the connection sleeve only for an axial length that is between ⅓ and ⅔ of the largest radial thickness of the second electrical insulation layer outside the second insulation groove.

According to one embodiment the second electrical insulation layer has a smallest radial second insulation thickness in the second insulation groove, and a largest radial thickness outside the second insulation groove, wherein the smallest radial second insulation thickness is in a range of ⅓ to ½ of the largest radial thickness of the second electrical insulation layer.

The first locking sleeve groove may be arranged in a first axial end portion of the connection sleeve and the second locking sleeve groove may be arranged in a second axial end portion of the connection sleeve. The first end portion and the second end portion are arranged at opposite axial ends of the connection sleeve.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
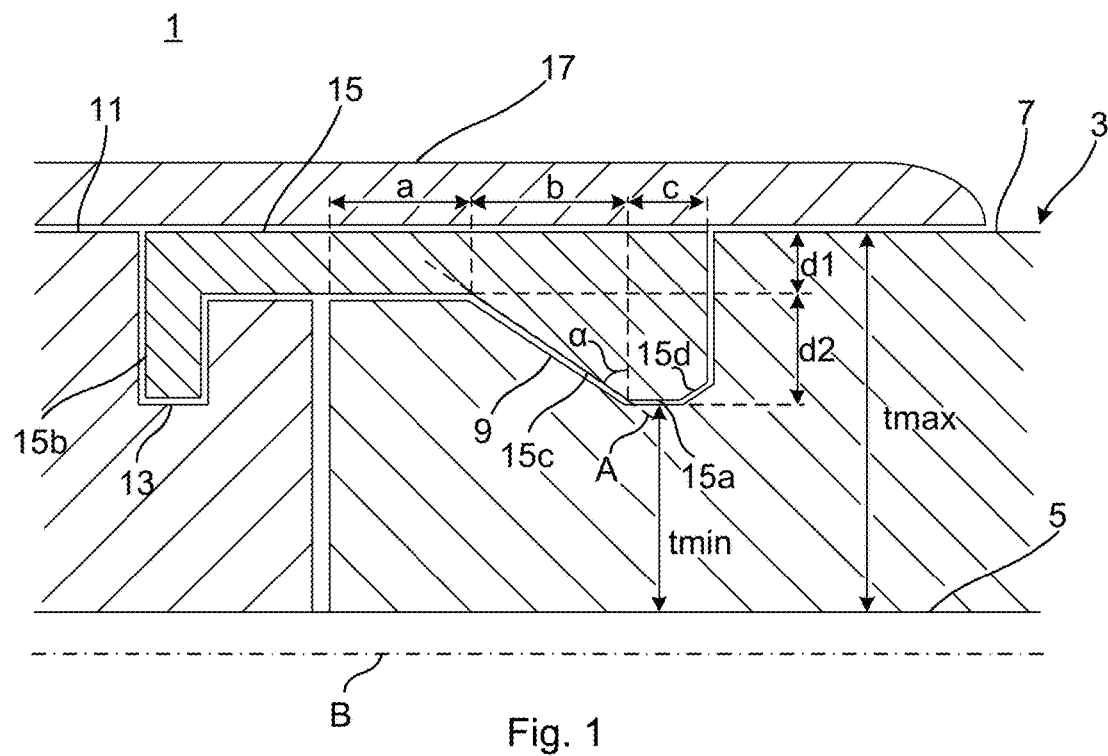
FIG. 1 schematically shows a longitudinal section of an example of portion of a power cable accessory assembly.

FIG. 1 shows an example of a power cable accessory assembly 1.

The power cable accessory assembly 1 comprises a first power cable 3.

The first power cable 3 comprises a first conductor 5, and a first electrical insulation layer 7 arranged around the first conductor 5.

The first power cable 3 may comprise an inner semiconducting layer (not shown) arranged between the first conductor 5 and the first electrical insulation layer 7.

The first electrical insulation layer 7 may comprise a thermosetting polymer. The thermosetting polymer may for example be XLPE, crosslinked ethylene propylene diene monomer rubber (EPDM), or crosslinked ethylene propylene rubber (EPR).

The first electrical insulation layer 7 comprises a first insulation groove 9. The first insulation groove 9 extends circumferentially along an outer surface of the first electrical insulation layer 7. The first insulation groove 9 may extend circumferentially around the entire periphery of the first electrical insulation layer 7.

The first insulation groove 9 may be made using a tool such as a customised knife.

The power cable accessory assembly 1 comprises a connection sleeve 11. The connection sleeve 11 comprises metal such as steel, copper or aluminium.

The connection sleeve 11 comprises a first axial end opening configured to receive an end portion of the first conductor 5 which protrudes axially from the first electrical insulation layer 7.

The end portion of the first conductor 5 may be fastened inside the connection sleeve 11. The end portion of the first conductor 5 may for example be fastened inside the connection sleeve 11 by means of screws or bolts.

The connection sleeve 11 has a first locking sleeve groove 13 extending circumferentially along an outer surface of the connection sleeve 11. The first locking sleeve groove 13 may extend circumferentially around the entire periphery of the connection sleeve 11.

The power cable accessory assembly 1 comprises a first locking sleeve 15. The first locking sleeve 15 may be made of metal such as steel, e.g., stainless steel, copper or aluminium.

The first locking sleeve 15 may comprise two halves which can be assembled with each other around the first power cable 3, for example by means of screws.

The first locking sleeve 15 comprising a first radially inwards extending flange 15a.

The first radially inwards extending flange 15a may extend circumferentially around the entire inner periphery of the first locking sleeve 15.

The first radially inwards extending flange 15c is configured to engage with the first insulation groove 9.

The first locking sleeve 15 has a second radially inwards extending flange configured to engage with the first locking sleeve groove 13.

The second radially inwards extending flange 15b may extend circumferentially around the entire inner periphery of the first locking sleeve 15.

The first radially inwards extending flange 15a has a first radial dimension that decreases gradually in an axial direction towards the connection sleeve 11.

The first radial dimension that decreases gradually decreases at a first linear rate.

The first insulation groove 9 has a second radial dimension that decreases gradually in the axial direction towards the connection sleeve 11.

According to one example, the second radial dimension that decreases gradually decreases at the first linear rate.

The first radially inwards extending flange has a surface 15c that in a longitudinal section of the first locking sleeve 15 defines the gradually decreasing first radial dimension. The surface 15c is arranged parallel with an inner surface of the first insulation groove 9 when the first radially inwards extending flange 15a is received by the first insulation groove 9.

The surface 15c defines an axis A that intersects a longitudinal axis B of the first locking sleeve 15 with an angle α in a range of 15-80 degrees, such as degrees, such as 25-75 degrees, such as 30-70 degrees.

In a longitudinal section of the power cable accessory assembly 1, the first insulation groove 9 and the first radially inwards extending flange 15a may be congruent.

The first radially inwards extending flange 15a may have a far edge 15d relative to the connection sleeve 11 which is rounded or bevelled.

The first radially inwards extending flange 15a may have a maximal radial dimension that is greater than a maximal radial dimension of the second radially inwards extending flange 15b. The first insulation groove 9 may thus be radially deeper than the first locking sleeve groove 13.

The first radial dimension may decrease gradually in an axial direction towards the connection sleeve 11 only for an axial length b that is between ⅓ and ⅔ of the largest radial thickness tmax of the first electrical insulation layer 7 outside the first insulation groove 9. Hereto, the axial length b of the surface 15c may be ⅓tmax<b<⅔tmax.

The first electrical insulation layer 7 has a smallest radial first insulation thickness tmin in the first insulation groove 9. The first electrical insulation 7 is thus thinnest in the first insulation groove 9. The smallest radial first insulation thickness tmin may be in a range of ⅓ to ½ of the largest radial thickness tmax of the first electrical insulation layer 7, i.e., ⅓tmax<tmin<½tmax.

The axial distance a from a radial end face of the first electrical insulation layer 7 facing the connection sleeve 11 to the closest edge of the first insulation groove 9 may for example be between 7-35 mm, such as 10-30 mm, depending on the insulation material and dimensions of the first power cable.

The inclined inner surface of the first insulation groove 9 facing the surface 15c may in an axial direction from the connection sleeve 11 towards the first insulation groove 9 transition into a planar bottom surface which is parallel with the longitudinal axis B. Further in the axial direction from the connection sleeve 11 towards the first insulation groove 9, the planar bottom surface may transition to a rounded or straight inclined portion relative to the longitudinal axis B before turning into a radial surface which defines the end of the first insulation groove 9. The axial distance c from the point where the planar bottom surface begins to the transition point to the radial surface may for example be 2-12 mm, such as 3-8 mm.

The rounded or straight inclined portion of the first insulation groove 9 may be congruent with the far edge 15d of the first radially inwards extending flange 15a.

The radial thickness d1 of the first locking sleeve 15 in a portion between the first radially inwards extending flange 15a and the second radially inwards extending flange 15b, which may be the radially thinnest dimension of the first locking sleeve 15 may for example be 2-8 mm such as 3-5 mm. This dimension is dependent of the thickness of the first electrical insulation layer and the material of the first electrical insulation layer.

The radial distance d2 from the inner surface of the first locking sleeve 15 where the first locking sleeve 15 has the radial thickness d1 to the bottom of the first insulation groove 9 may be in a range of ⅓ to ½ of the largest radial thickness tmax of the first electrical insulation layer 7, i.e., ⅓tmax<d2<½tmax.

The first locking sleeve 15 has an outer surface that is arranged essentially in level or in level with, or flush with, the outer surface of the first electrical insulation layer 7.

The first locking sleeve 15 has an outer surface that is arranged essentially in level or in level with, or flush with, the outer surface of the connection sleeve 11.

The connection sleeve 11, the first locking sleeve 15, and the first power cable 3 may form part of a power cable joint or a power cable termination. The term "accessory" in "power cable accessory assembly" may thus refer to a power cable joint or a power cable termination.

According to the example, the power cable accessory assembly 1 comprises a deflector 17. The deflector 17 comprises an electrically conducting material.

The deflector 17 is arranged radially outside the connection sleeve 11, the first locking sleeve 15 and the first electrical insulation layer 7.

The deflector 17 covers the entire first locking sleeve 15 axially. The deflector 17 extends axially beyond the first locking sleeve 15 in an axial direction from the connection sleeve 11 towards the first insulation groove 9.

The power cable accessory assembly 1 may comprise a field grading layer (not shown) arranged radially outside the deflector 17. The field grading layer may comprise a rubber material comprising a filler material to provide the field grading property.

The power cable accessory assembly 1 may comprise a joint insulation layer (not shown) arranged radially around at least a portion of the axial length of the field-grading layer. The joint insulation layer may for example comprise a polymeric material such as XLPE, EPDM, EPR or polypropylene.

The power cable accessory assembly 1 may comprise a rigid casing such as a metal casing, or a shrink tube arranged around the joint insulation layer. The rigid casing or shrink tube forms an outermost surface of the power cable accessory assembly 1.

The deflector 17, the field grading layer, and the joint insulation layer may form part of a prefabricated joint insulation sleeve.

Figure 2:
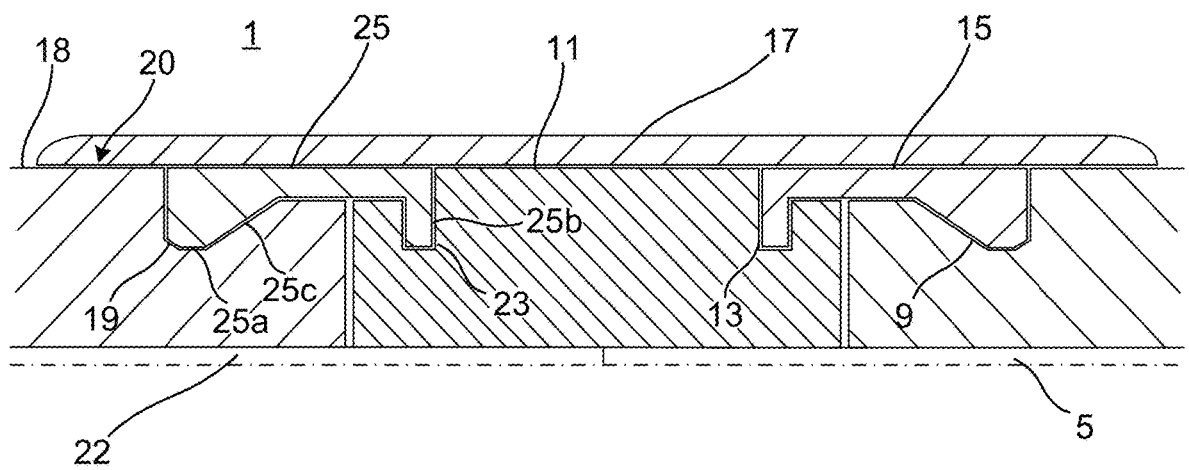
FIG. 2 schematically shows a longitudinal section of an example of portion of a power cable accessory assembly comprising a power cable joint.

FIG. 2 shows an example in which the power cable accessory assembly 1 forms a power cable joint. The lefthand side of the power cable accessory assembly 1 relative to the connection sleeve 11 is depicted in FIG. 2. This side is identical to the righthand side already shown in FIG. 1.

The power cable accessory assembly 1 comprises a second power cable 20.

The second power cable comprises a second conductor 22 which is spliced or jointed with the first conductor 5 of the first power cable 2 inside the connection sleeve 11.

The second power cable 20 comprises a second electrical insulation layer 18 arranged around the second conductor 22.

The second electrical insulation layer 18 comprises a second insulation groove 19 extending circumferentially along an outer surface of the second electrical insulation layer 18.

The connection sleeve 11 is arranged axially between the first electrical insulation layer 7 and the second electrical insulation layer 18.

The connection sleeve 11 comprises a second axial end opening configured to receive an end portion of the second conductor 22 protruding axially from the second electrical insulation layer 18.

The connection sleeve 11 comprises a second locking sleeve groove 23 extending circumferentially along an outer surface of the connection sleeve 11.

The power cable accessory assembly 1 comprises a second locking sleeve comprising a third radially inwards extending flange 25a configured to engage with the second insulation groove 19, and a fourth radially inwards extending flange 25b configured to engage with the second locking sleeve groove 23.

The third radially inwards extending flange 25a has a third radial dimension that decreases gradually in an axial direction towards the connection sleeve 11 and the second insulation groove 19 has a fourth radial dimension that decreases gradually in the axial direction towards the connection sleeve 11.

The general structure of the second connection sleeve 25 and the second insulation groove 19 is the same as for the first connection sleeve 15 and the first insulation groove 9 described above, and will for this reason not be described in more detail herein.

In case the power cable accessory assembly would form part of a power cable termination, the first conductor of the first power cable connection sleeve could be connected to a conductor inside a cable termination casing by means of the connection sleeve. The deflector could in this case form part of a stress cone arranged around the first locking sleeve.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A power cable accessory assembly comprising:
   a first power cable including:
   first conductor, and
   a first electrical insulation layer arranged around the first conductor,
   wherein the first electrical insulation layer includes a first insulation groove extending circumferentially along an outer surface of the first electrical insulation layer;
   a connection sleeve including:
   a first axial end opening receiving an end portion of the first conductor protruding axially from the first electrical insulation layer, and
   a first locking sleeve groove extending circumferentially along an outer surface of the connection sleeve; and
   a first locking sleeve including:
   a first radially inwards extending flange engaging with the first insulation groove and a second radially inwards extending flange engaging with the first locking sleeve groove to restrict axial movement between the first electrical insulation layer and the connection sleeve,
   wherein the first radially inwards extending flange has a first radial dimension that decreases gradually in an axial direction towards the connection sleeve, and wherein the first insulation groove has a second radial dimension that decreases gradually in the axial direction towards the connection sleeve;
   wherein the first radially inwards extending flange has a surface defines the gradually decreasing first radial dimension, wherein in a longitudinal section of the first locking sleeve the surface defines an axis that intersects a longitudinal axis of the first locking sleeve with an angle in a range of 15-80 degrees.

2. The power cable accessory assembly as claimed in claim 1, wherein the first radial dimension that decreases gradually decreases at a first linear rate.

3. The power cable accessory assembly as claimed in claim 2, wherein the second radial dimension that decreases gradually decreases at the first linear rate.

4. The power cable accessory assembly as claimed in claim 1, wherein the first radially inwards extending flange has a maximal radial dimension that is greater than a maximal radial dimension of the second radially inwards extending flange.

5. The power cable accessory assembly as claimed in claim 1, wherein the first radial dimension decreases gradually in an axial direction towards the connection sleeve only for an axial length that is between ⅓ and ⅔ of the largest radial thickness of the first electrical insulation layer outside the first insulation groove.

6. The power cable accessory assembly as claimed in claim 1, wherein the first electrical insulation layer has a smallest radial first insulation thickness in the first insulation groove, and a largest radial thickness outside the first insulation groove, wherein the smallest radial first insulation thickness is in a range of ⅓ to ½ of the largest radial thickness of the first electrical insulation layer.

7. The power cable accessory assembly as claimed in claim 1, wherein the first electrical insulation layer includes a thermosetting polymer.

8. The power cable accessory assembly as claimed in claim 1, wherein the first radially inwards extending flange has a far edge relative to the connection sleeve, the far edge being rounded or bevelled.

9. The power cable accessory assembly as claimed in claim 1, forming a power cable termination.

10. A power cable accessory assembly comprising:
a first power cable including:
first conductor, and
a first electrical insulation layer arranged around the first conductor,
wherein the first electrical insulation layer includes a first insulation groove extending circumferentially along an outer surface of the first electrical insulation layer;
a connection sleeve including:
a first axial end opening receiving an end portion of the first conductor protruding axially from the first electrical insulation layer, and
a first locking sleeve groove extending circumferentially along an outer surface of the connection sleeve; and
surface of the connection sleeve; and
a first locking sleeve including:
a first radially inwards extending flange engaging with the first insulation groove and a second radially inwards extending flange engaging with the first locking sleeve groove to restrict axial movement between the first electrical insulation layer and the connection sleeve,
wherein the first radially inwards extending flange has a first radial dimension that decreases gradually in an axial direction towards the connection sleeve, and
wherein the first insulation groove has a second radial dimension that decreases gradually in the axial direction towards the connection sleeve;
wherein the power cable accessory assembly forms a power cable joint, the power cable accessory assembly comprising:
a second power cable including:
second conductor, and
a second electrical insulation layer arranged around the second conductor,
wherein the second electrical insulation layer includes a second insulation groove extending circumferentially along an outer surface of the second electrical insulation layer,
wherein the connection sleeve is arranged axially between the first electrical insulation layer and the second electrical insulation layer, and includes:
a second axial end opening receiving an end portion of the second conductor protruding axially from the second electrical insulation layer,
a second locking sleeve groove extending circumferentially along an outer surface of the connection sleeve; and
a second locking sleeve including a third radially inwards extending flange engaging with the second insulation groove and a fourth radially inwards extending flange engaging with the second locking sleeve groove to restrict axial movement between the second electrical insulation layer and the connection sleeve, and
wherein the third radially inwards extending flange has a third radial dimension that decreases gradually in an axial direction towards the connection sleeve, and
wherein the second insulation groove has a fourth radial dimension that decreases gradually in the axial direction towards the connection sleeve.

11. The power cable accessory assembly as claimed in claim 10, wherein the third radial dimension that decreases gradually decreases at a second linear rate.

12. The power cable accessory assembly as claimed in claim 11, wherein the fourth radial dimension that decreases gradually decreases at the second linear rate.

13. The power cable accessory assembly as claimed in claim 10, wherein the third radially inwards extending flange has a surface that defines the gradually decreasing third radial dimension, wherein in a longitudinal section of the second locking sleeve the surface defines an axis that intersects a longitudinal axis of the second locking sleeve with an angle in a range of 15-80 degrees.

14. The power cable accessory assembly as claimed in claim 10, wherein the third radial dimension decreases gradually in an axial direction towards the connection sleeve only for an axial length that is between ⅓ and ⅔ of the largest radial thickness of the second electrical insulation layer outside the second insulation groove.

15. A power cable accessory assembly comprising:
a first power cable including:
first conductor, and
a first electrical insulation layer arranged around the first conductor,
wherein the first electrical insulation layer includes a first insulation groove extending circumferentially along an outer surface of the first electrical insulation layer;
a connection sleeve including:
a first axial end opening receiving an end portion of the first conductor protruding axially from the first electrical insulation layer, and
a first locking sleeve groove extending circumferentially along an outer surface of the connection sleeve; and
a first locking sleeve including:
a first radially inwards extending flange first engaging with the first insulation groove and a second radially inwards extending flange engaging with the first locking sleeve groove to restrict axial movement between the first electrical insulation layer and the connection sleeve,
wherein the first radially inwards extending flange has a first radial dimension that decreases gradually in an axial direction towards the connection sleeve, and
wherein the first insulation groove has a second radial dimension that decreases gradually in the axial direction towards the connection sleeve; and
wherein the first radially inwards extending flange has a maximal radial dimension that is greater than a maximal radial dimension of the second radially inwards extending flange.

16. The power cable accessory assembly as claimed in claim 15, wherein the first radially inwards extending flange has a surface that defines the gradually decreasing first radial dimension, wherein in a longitudinal section of the first locking sleeve the surface defines an axis that intersects a longitudinal axis of the first locking sleeve with an angle in a range of 15-80 degrees.

17. The power cable accessory assembly as claimed in claim 15, wherein the first radial dimension decreases gradually in an axial direction towards the connection sleeve only for an axial length that is between ⅓ and ⅔ of the largest radial thickness of the first electrical insulation layer outside the first insulation groove.

18. The power cable accessory assembly as claimed in claim 15, wherein the first electrical insulation layer has a smallest radial first insulation thickness in the first insulation groove, and a largest radial thickness outside the first insulation groove, wherein the smallest radial first insulation thickness is in a range of ⅓ to ½ of the largest radial thickness of the first electrical insulation layer.

\* \* \* \* \*